Patented Dec. 26, 1944

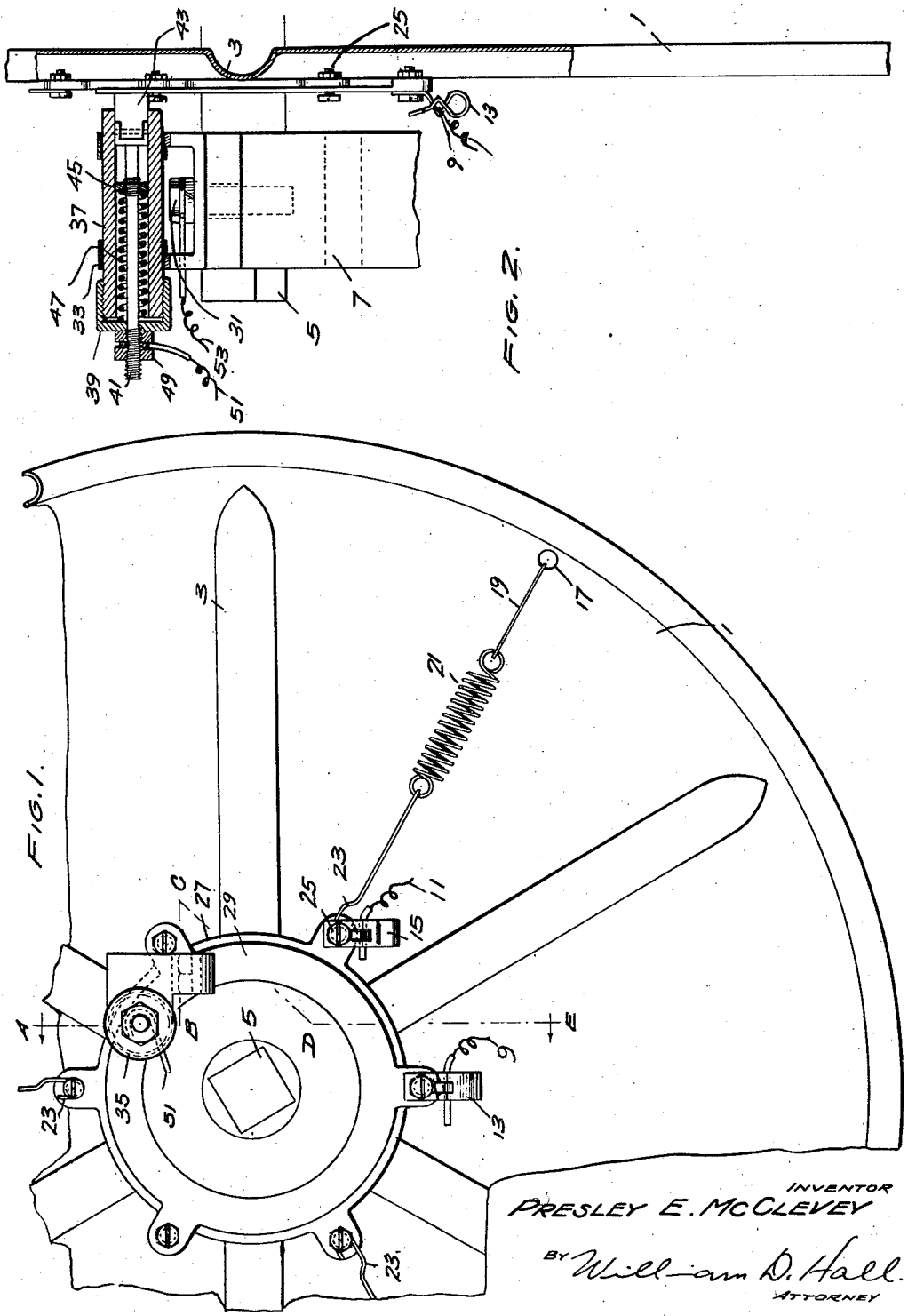

2,365,711

UNITED STATES PATENT OFFICE 2,365,711

CONSTANT COMMUNICATION DEVICE

Presley E. McClevey, Chicago, Ill.

Application March 12, 1943, Serial No. 478,902

4 Claims. (Cl. 191—12)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means for providing an electric connection to a coil of wire carried by a rotating reel.

It is an object of my invention to provide a telephone communication between a wire or cable laying vehicle such as an automobile or boat, and a telephone connected thereto while the wire or cable is being laid.

More specifically, the machine forming the subject matter of my invention comprises, a movable vehicle, such as an automobile truck, having a support for a reel which is mounted so as to be rotatable thereon, a telephone or like cable formed of metal wires coiled on the reel, a sheet of insulation resiliently mounted on the reel by means of springs having hooks at their ends which pass through holes in the reel, a ring of metal supported by the insulation, spring clips forming quickly detachable connectors by means of which the ends of the wires forming the cable can be connected to the ring and grounded to the support, a brush bearing on the ring and carried by the support so that the electricity can be led off from the reel while it is rotating, and means for connecting a telephone or similar communications instrument to said brush and to a non-rotating part of the support so that communication may be had through the cable while it is being paid off the reel to the end of the cable which has already been laid.

For a further exposition of my invention and of additional objects of it, reference is to be had to the annexed drawing and specification at the end of which the novel features of my invention will be specifically pointed out and claimed.

In the drawing,

Figure 1 is a fragmentary side elevation of my device with parts omitted for the sake of clarity.

Figure 2 is a cross section on the line A—B—C—D—E of Figure 1 viewed in the direction of the arrows.

From among other embodiments of my invention, I have selected the one shown in the drawing as illustrative. This selected embodiment is comprised as follows:

A reel of any familiar type adapted to carry a coil or winding of wire or cable thereon is generally indicated by a flange 1 having corrugated ribs or re-enforcements 3 thereon. This reel is mounted for rotation on a vehicle, such as an automobile truck, by means of an axle 5 which is supported by a bearing, generally indicated at 7, and omitted from Figure 1. A coil of wire or cable is wound on the reel but is omitted from the drawing for the sake of clarity, only the ends of the coil being indicated as pigtails 9 and 11. These pigtails are shown as attached to spring fastening devices 13 and 15, respectively, of the "Fahnestock" clip type.

Flange 1 of the reel has a plurality of holes at its rim, of which one is shown at 17. Through each hole 17 may be passed a hook 19 on the end of a coiled spring 21 having another hook 23 at its inner end. Hooks 23 are attached by any convenient means such as screws 25, to a sheet of insulation 27. Springs 21 thus provide means for resiliently mounting sheet 27 and the parts carried thereby for rotation with the reel about axle 5. Sheet 27 carries a ring 29 of conducting material. Ring 29 has electric contact with spring clip 13, while clip 15 has electric contact with one hook 23 and thus grounds through coil 21 and hook 19 to flange 1.

As can best be seen in Figure 2, bearing 7 has a bolt 31 forming a part thereof and serving to attach a U-shaped bracket 33 from which extend ears 35 through which passes a pipe 37 having a perforated cap 39 at one end. Pipe 37 is insulated from the frame of which bearing 7 forms a part, in any convenient way. Through cap 39 projects one end of bolt 41 to the opposite end of which is attached, in any convenient way, carbon brush 43 bearing upon metal ring 29. Between its ends, bolt 41 has screw-threaded engagement with washer 45. A spring 47 is located between cap 39 and washer 45 and stresses brush 43 into contact with ring 29. Lock nuts 49 on bolt 41 limit the movement of bolt 41 and brush 43 towards engaged position and also serve as means for attaching one end of a wire (indicated as pigtail 51) leading to a communications equipment such as a telephone. Another wire connected to this equipment is grounded to bearing 7 by means of bolt 31 and is designated by reference character 53 applied to that end which is shown in the drawing.

The operation of my device is believed to be easily understood. One end of the cable mounted on the reel is paid off from the rotating reel to the ground or other relatively stationary location. On the vehicle which carries the reel, electricity is led from a communications equipment, such as a telephone, through the pigtail or lead 51 to the brush 43, plate 29, and clip 13 to the wire whose end is shown as pigtail 9 which forms a part of that end of the cable which is mounted on and rotating with the reel. Another part of this end of the cable is shown as pigtail 11 attached to clip 15, whence connection is had through hook 23, coil 21, hook 19, and hole 17 to flange 1 of the reel from where there is provided a metallic path through the metal parts of the machine to bearing 7, bolt 31, and pigtail 53 forming the opposite side of the connection to the equipment. Thus it is readily seen that a person on the vehicle may communicate through the circuit described including the cable to another at the other end of the cable even while the reel is rotating and paying off cable therefrom.

What I desire to claim as my invention and secure by Letters Patent is:

1. A device providing for communication through a wire cable while it is being laid from a reel, said device comprising, a plurality of springs each having a hook at one end thereof, said hooks being adapted to be secured to the reel, a sheet of insulation mounted on the opposite ends of said springs from said hooks in substantially concentric relation with the rotational axis at the reel a ring of conducting material mounted on said sheet, a brush of conducting material positioned so as to bear on and reciprocate with a limited motion relative to said ring, and terminals providing for ready attachment and detachment of the wires of said cable to said ring and to one of said springs respectively.

2. Mobile means providing a substantially continuous channel for communications comprising, a movable support, a reel mounted for rotation on said support, a coil of wire constituting a communications cable coiled on said reel, a plurality of springs each having one end shaped for convenient engagement with and disengagement from said reel, an insulating base plate hung from the free ends of said springs in substantially concentric relation with the rotational axis at said reel a conducting plate mounted on said base plate, and spring terminal clips, one connected to said conducting plate and one connected to one of said springs to receive the ends of said coil of wire in said clips.

3. In a device for providing an electric connection to a coil of wire carried by a rotating reel, a brush positioned adjacent and stationary relative to the rotation of said reel, an insulated metal plate positioned for rotation with said reel and against which said brush constantly abuts in electrical contact, and a spring means providing a quickly detachable resilient mounting for said plate.

4. In a device for providing an electric connection to a coil of wire carried by a rotating reel, a brush positioned adjacent and stationary relative to the rotation of said reel, a metal plate positioned for rotation with said reel and against which said brush abuts, a sheet of insulation separating said plate from the reel and providing a support for said plate, and a plurality of coil springs each connected at one end to said insulation and having a hook at its opposite end adapted for connection with said reel.

PRESLEY E. McCLEVEY.